Feb. 5, 1952 M. ROSENBERG ET AL 2,584,814

COLOR TELEVISION PICTURE TUBE

Filed June 16, 1950 2 SHEETS—SHEET 1

INVENTORS
JAN A. RAJCHMAN AND
MILTON ROSENBERG
BY
Roderick Malcolm
ATTORNEY

Feb. 5, 1952 M. ROSENBERG ET AL 2,584,814

COLOR TELEVISION PICTURE TUBE

Filed June 16, 1950 2 SHEETS—SHEET 2

INVENTORS
JAN A. RAJCHMAN AND
MILTON ROSENBERG
BY
Roderick Malcolm
ATTORNEY

Patented Feb. 5, 1952

2,584,814

UNITED STATES PATENT OFFICE 2,584,814

COLOR TELEVISION PICTURE TUBE

Milton Rosenberg, Trenton, and Jan A. Rajchman, Princeton, N. J., assignors to Radio Corporation of America, a corporation of Delaware Application June 16, 1950, Serial No. 168,562

11 Claims. (Cl. 313—92)

This invention relates to television picture tubes. More particularly, it relates to an improved picture tube capable of producing full color images.

Certain proposed color-kinescopes utilize, in combination with a source of electrons, an electron-sensitive color screen made up of a great many phosphor-coated areas of sub-elementary image - dimensions. The individual phosphor coatings may be dots of pin-point size or strips of hair-line thinness. They are positioned on a foundation surface of the screen in groups. The total area embraced by each group corresponds to a single black-and-white "picture element." Each sub-elementary coating in a group consists of fluorescent material which emits light of a different color (e. g., red, green or blue) when struck by electrons. The groups as such are usually positioned in a pattern of parallel lines corresponding to the image raster. In a kinescope of this kind it is necessary to make sure that a burst of electrons intended to cause the screen to produce light of a particular color shall impinge only on the appropriate kind of sub-elementary coating. This requires the attainment of accurate "registry" of discrete bursts of electrons impinging onto different sub-elementary coatings and separate control thereof by different color signals.

A color television picture tube which meets these requirements is described in co-pending application Serial No. 151,397, which was filed March 23, 1950, in the name of Jan A. Rajchman and assigned to the assignee of the present application.

To attain "registry," in the tube shown in this co-pending application, it is arranged so that the electron beam must effectively pass through an apertured plate to reach any part of the screen. In passing through the plate, the beam is split into a number of adjacent parallel jets. The apertures are small enough and close enough together so that a beam focused as sharply as in black-and-white practice (for an image of equal size) will be split into at least as many jets as the number of sub-elementary coatings in each group. There is a different aperture for each sub-elementary coating in each "picture element." (Thus, for a three-color, 525-line system having equal horizontal and vertical resolution, the number of apertures and of sub-elementary coatings would equal $525^2 \times 3$ or 826,875). Moreover, the apertures are positioned in the same pattern as the coatings. Due to this and to the orientation of the plate with respect to the image surface, each jet that reaches the screen will necessarily bombard a particular coating and not any other. In the operation of the tube, the different colors in which the coatings in each group fluoresce appear to be mixed when viewed from a distance. Moreover, this is true whether these coatings are energized simultaneously or in sequence at a high cyclical rate.

The following is a general description of the manner in which the same tube (of the co-pending application) is arranged to assure that each different color signal controls all light emissions of one particular color and none of any other. A group of closely-spaced, parallel multi-apertured electrodes, including the above-mentioned apertured plate, is mounted between the electron gun and the screen. One aperture of each electrode is in alignment with a corresponding aperture of each of the other electrodes and with one of the sub-elementary coatings. Some of the electrodes serve as selective "retarding" electrodes. They function selectively in that each of these electrodes "retards" only jets which are directed toward the screen to cause emission of a particular color. Their "retarding" of electrons is effectual rather than actual. More specifically, each of these electrodes translates certain selected high-speed electron jets into low-speed secondary-electron jets. To this end, each of these electrodes has certain selected ones of its apertures covered over with thin, secondary emitter foils. When a high-speed jet impinges on one side of one of these foils, it is absorbed by it and the foil emits a low-speed jet of secondary electrons from its opposite side. A control electrode is positioned in front of each of these "retarding" electrodes to cover its entire front surface. During operation, this control electrode is so biased that a video signal (or color-switching signal) which is applied to it is able to influence, i. e., current-modulate, only the low-speed jets which are directed at certain ones of its apertures. The other jets pass through others of its apertures at such high velocities that they are not materially influenced by its voltage fluctuations. Each and every jet into which the beam is subdivided during every fully-scanned raster gets to be "retarded" at one or another of the retarding electrodes and thereby becomes controllable by only the particular control electrode which is positioned next in front of it.

A selective retarding electrode having secondary emitter foils is a relatively costly type of tube element. Moreover, the "retarded" jets which emerge from its screen side are not ideally susceptible of focusing and control since the secondary electrons of which they are principally constituted have a relatively large velocity dispersion and since, in addition, they include a small percentage of high-velocity "penetrating primaries."

Accordingly, it is an object of this invention to provide for a color television picture tube of the kind referred to above, an improved means for controlling electron jets selectively in accordance with the different kinds of sub-elementary screen coatings toward which they are directed.

It is a further object of this invention to provide as a part of the improved means set forth above an improved retarding electrode not requiring the use of secondary emitter foils.

In general, according to the present invention, instead of covering selected apertures of a given electrode with secondary-emitter foils, those apertures are made smaller than all of the others in the same electrode. The difference in sizes is great enough so that a jet which approaches a small aperture "sees" substantially more of a retarding potential which is applied to the electrode than does a jet which approaches a large aperture. In this arrangement, as distinguished from that of the co-pending application, the selected jets are actually retarded instead of being replaced by slow jets of secondary electrons. In addition, in the present tube, each selective retarding electrode can also act as a modulating or switching electrode for the selected jets which it retards. To this end, in addition to being polarized at a retarding direct potential, each of these electrodes can also be connected to a color video signal source to modulate those jets, or to a color switching signal source to turn them on and off.

However, the fact that the present retarding electrodes can have dual functions does not reduce by a factor of two the number of electrodes required for the present tube over that required for the tube described in the above-mentioned co-pending application. This is because the retarding electrodes shown therein likewise can have dual functions, albeit the second function of the two kinds of retarding electrodes are different. The second possible function for the secondary-emitter type of "retarding" electrode is that of accelerating certain jets which it does not "retard." In the present picture tube, certain "screen electrodes" (to be described below) are provided to perform a corresponding function.

Figure 6:
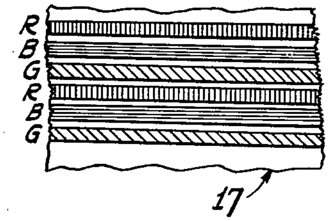
Figure 8:
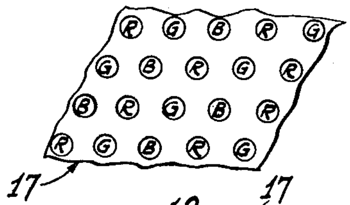
Figure 7:
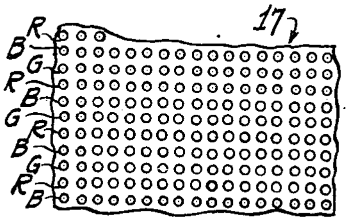
Figure 9:
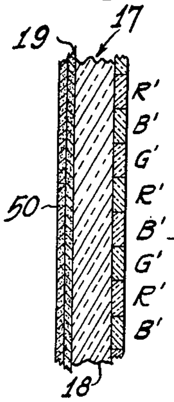

Figs. 6, 7, and 8 represent different patterns in which sub-elementary coatings may be arranged to form screens suitable for use in the present invention; and Fig. 9 is an enlarged sectional view of a portion of another suitable screen.

Figure 1:
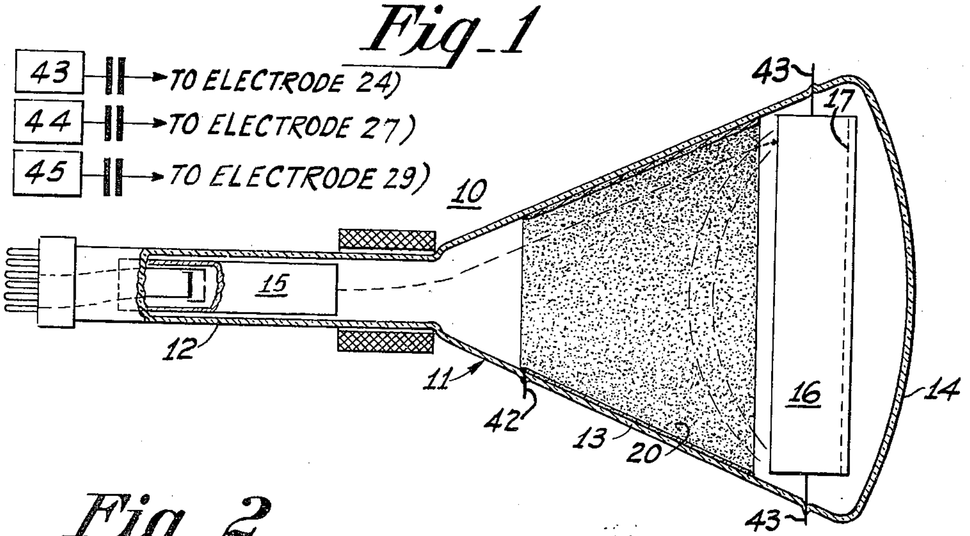
Fig. 1 represents an embodiment of the invention partly taken in section.
Figure 2:
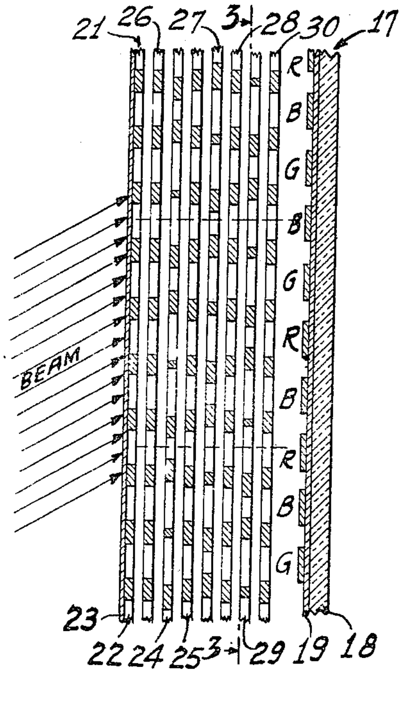
Fig. 2 is a greatly magnified fragmentary cross-sectional view of one type of control assembly suitable for use in the tube shown in Fig. 1, the section being taken along line 2—2 of Fig. 3.
Figure 4:
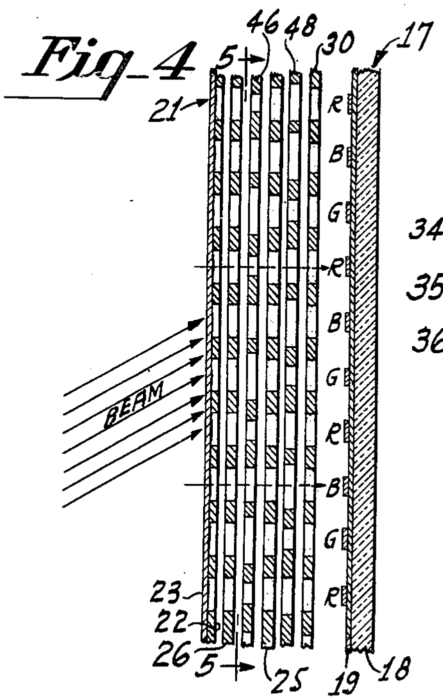
Fig. 4 is a similarly magnified fragmentary cross-sectional view of another type of control assembly suitable for use in the tube shown in Fig. 1, the section being taken along line 4—4 of Fig. 5.

The picture tube 10 shown in Fig. 1 includes an envelope 11 having a neck 12, a frustum 13, and a window 14. Within neck 12 there is mounted an electron gun 15. It is directed toward the back of a control assembly, represented generally by block 16 in Fig. 1, which is supported behind window 14 by any suitable means (not shown). A target 17 is mounted on the side of assembly 16 farthest from the electron gun 15. As best shown in Figs. 2, 4 and 9, the target 17 comprises a glass support plate 18, a transparent conductive coating 19 on the back thereof, such as a "nesa" coating, and a great many dot- or strip-type sub-elementary fluorescent coatings, R, G, B. In the description which follows (but not in the claims), "coating" will mean coatings of the dot-type unless they are specifically otherwise designated. Each of the coatings R, B, and G, emits light of a different hue in response to electron bombardment. However, if desired, a single uniform fluorescent coating 50 may be used as shown in Fig. 9. Such a single coating can be used in combination with a multi-sub-element optical filter, for example, a filter made of elementary parts R′, B′, G′, each of which selectively transmits light of a predetermined color.

A conductive coating 20 (Fig. 1) on the inside of frustum 13 serves as an accelerating electrode.

In the operation of tube 10 a beam of electrons from gun 15 is caused to trace a raster pattern over the back of assembly 16. Assembly 16 has as many individual back-to-front passageways for electron jets as the total number of sub-elementary coatings R, B, and G. Target 17 is mounted on the front of assembly 16 in such a position that each of its coatings R, G, and B is in exact alignment with a different passageway. These passageways and the spacings between them are so small that at any instant of time the beam will strike the backs of several of them to be subdivided into an equal number of jets. Each passageway extends through a succession of exactly aligned apertures, i. e., of apertures whose centers are exactly aligned, formed in the respective electrodes occurring from the back to the front of assembly 16.

The electrode nearest to gun 15 in assembly 16 is a normalizing electrode 21. Its use overcomes difficulties caused by the fact that the scanning beam from gun 15 does not always approach the back of the assembly 16 along paths which are normal thereto. Without this electrode, beam electrons might enter some of the passageways at angles so far from normal as not to be able to go all the way through. Practical tests were made in which the back surface of a normalizing electrode 21 was bombarded with fast primary electrons at a variety of angles of incidence. Under these conditions, secondary electrons emerged from the opposite side at such low velocities that with a little forward acceleration they followed normal paths.

Normalizing electrode 21 includes a thin aluminum film (or foil) 23 which is carried on one side of a multi-apertured plate 22 and covers all of its apertures. This film may be formed by first wetting the back of plate 22 with a thin solution of organic material, e. g., collodion, so that its apertures are bridged by minute amounts thereof which are stretched into thin films by surface tension. After the solution has dried, the aluminum film 23 is evaporated on top of it. Later, for example in de-gassing of the completed tube, the collodion is baked out.

The next four electrodes immediately in front of normalizing electrode 21 (in the order named) are an accelerating electrode 26, a back selective control electrode 24, and a back screen electrode 25. In the operation of tube 10, the accelerating electrode 26 may be polarized at a direct potential one or two hundred volts more positive than that of the normalizing electrode 21 to accelerate the secondary electron jets through its apertures and project them toward the screen 17. Each of these and the other electrodes of the assembly 16 comprises an apertured plate having the same pattern for the positions of its aperture-centers as that of plate 22. However, a selected one-third of the apertures of the back control electrode 24 (and of each of two other control electrodes 27, 29, which are to be described below) are smaller than all of its other apertures. Each of the small apertures of the control electrode 24 is aligned with a different one of the R (red) sub-elementary coatings if these are of the dot type. On the other hand, where they are of the strip type, individual rows of these small apertures are respectively aligned therewith.

Accordingly, where the target 17 is either of the type shown in Fig. 6 or in Fig. 7 the apertures for all of the electrodes are positioned in parallel rows and in each control electrode all of the apertures of its every third row should be smaller than all its other apertures.

The screen electrode 25 (and each of two other screen electrodes, 28, 30, which are to be described below) comprises simply a smooth plate whose apertures are all of one size and are positioned in the same pattern as the apertures of plate 22.

Although their apertures are almost microscopically small, any of the apertured plates used in assembly 16 can be made with great accuracy in a number of known ways. For example, they may be made by a photo-etching process. According to this process, an exact replica of the screen is first drawn with pen and ink, this being done on a scale very much larger than one-to-one (if it will be helpful for attaining precision); a reduced facsimile of the replica is photographically produced if necessary; the thin copper sheet is coated with a photo-sensitive material, such as an albumen compound, which is adapted to harden on exposure to light; a light-image of the replica is projected onto the copper sheet; the unhardened portions of the photo-sensitive material are washed away; and the copper sheet is etched through in places exposed by the washing.

In the operation of tube 10, the control electrode 24 is biased at a retarding direct potential which is somewhat negative with respect to the normalizing electrode 21. As a result, it will so decelerate any electron jet which is moving through one of its small apertures that small fluctuations in its potential (for example, fluctuations caused by the superposition of a video or control signal on top of the direct potential) will be effective to current-modulate this jet. If the current-modulation is 100%, it will switch the jet on and off. At the same time, any jet(s) which is moving through any of its large apertures will continue to move so fast as not to be materially influenced by the fluctuations. This is due to the fact that in a region close to the relatively negative control electrode 24, a jet which approaches a small aperture (in moving between the relatively positive accelerating and screen electrodes 26, 25) encounters a potential hump which it is unable to overcome by its inertia whereas this will not be true of a jet which approaches a large aperture. Thus, the present invention provides an improved means (over that shown in the above-mentioned co-pending application) for the selective control of electron jets according to their positions.

In operating tube 10, each of the screen electrodes (25, already described, and 28 and 30, to be described below) should be polarized at a direct potential of from one to a few hundred volts more positive than the potential of the normalizing electrode 21 (i. e., than the potential of the emissive source which provides the electrons for the jets).

The electrode next ahead of the screen electrode 25 is the intermediate control electrode 27 (Fig. 2). From what has preceded and what is to follow, it will be apparent that this electrode 27 has the two functions of retarding and dynamically controlling (i. e., modulating or switching) any jets which move through the target assembly 16 along certain selected passageways. More specifically, these are the passageways which are aligned with the G coatings. If desired for any reason, though normally it would not be preferred, two separate successively-positioned electrodes could be used in place of each control electrode to perform its above-mentioned respective functions of retarding and modulating.

An intermediate screen electrode 28 (Fig. 2) is positioned in front of control electrode 27. These two electrodes may be considered as comprising a second stage for the selective control of certain electron jets predetermined according to their positions (i. e., the green-exciting jets). Similarly, two more electrodes co-operate in a third stage for the selective control of the blue-exciting jets. These electrodes, a front control electrode 29 and a front screen electrode 30, are positioned in front of the intermediate screen electrode 28 in the order named.

Tests have indicated the following to be suitable operating direct potentials: +3000 volts for the normalizing electrode 21; a few volts less than +3000 volts for each of the control electrodes 24, 27, 29; a few hundred volts more than +3000 volts for the accelerating electrode 26; a few hundred volts more than +3000 volts for each of the screen electrodes 25, 28, 30; and +15,000 to +25,000 volts for the target 17 (each of these potentials being related to that of the cathode of electron gun 15 as a zero-volts reference). When target 17 is spaced in front of the front screen electrode by as much as .125 to .200 inches, each jet of electrons impinges accurately on a desired predetermined coating (R, G, or B) if an accelerating voltage of as much as 10,000 volts is established across this space. Moreover, any increase in this voltage permits an increase in this spacing and vice versa. Therefore, it is quite feasible to attain high-level target excitation with almost all of the electron kinetic energy being provided by post-acceleration. Since this is so, the beam electrons do not need to attain more than a relatively low range of velocities, e. g., of a few thousand volts while still moving through neck 12. Therefore, tube 10 does ; require large amounts of deflection power. is known, velocities of the order of a few ɔusand volts may be quite sufficient for attain- ; sharp focus of electrons projected from an ctron gun onto a scanned target surface such the back surface of the normalizing elec- ɔde 21.

The electrodes of control assembly 16 and its rget 17 may be assembled in exact registry in y convenient manner such as in the way sug- sted in the above-mentioned co-pending ap- cation.

Figure 3:
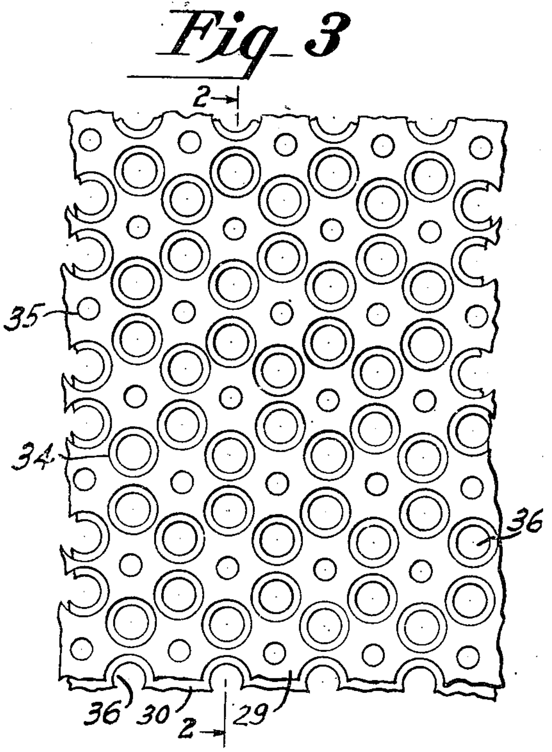
Fig. 3 represents a similarly magnified view of a small portion of a section of the assembly shown in Fig. 2, the section being taken along line 3—3 of Fig. 2.

Fig. 3 represents a very much magnified view a small surface of the control electrode 29 nd of the screen electrode 30, underlying it) as might appear under a microscope. It shows ie possible geometric arrangement for its large ıd small apertures. The different size aper- ıres are positioned with their centers in straight ɔws and with an "interlaced" order of occur- ɛnce in a pattern which is operatively com- atible with any of the screen arrangements ɔown in Figs. 6–8. The diameter of the large pertures 34 may be twice or even more than vice that of the small apertures 35. However, ɪis is not necessary since it is possible to attain dequate control contrast for a two-to-one ratio f diameters. The control contrast is adequate 'hen a control electrode has a sufficiently high ıu at its small apertures (a high enough mu o that it is not necessary to use inordinately arge video or switching voltages) and at the ame time has substantially no control at its arge apertures. All of the apertures 36 of the ınderlying screen electrode are of an inter- nediate size.

If desired, the control assembly 16 may be nodified by eliminating the secondary-emitter 'oil 23 covering the apertures of the normalizing electrode 21. In operating a tube 10 with a thus-modified control assembly the conductive coatings 20 (Fig. 1) in frustum 13 and the apertured plate 22 are polarized at different direct potentials to establish a large-diameter electrostatic normalizing lens in the region between them. This electron lens will cause the final approach of the scanning beam from gun 15 to the back of the assembly 16 to be at substantially right angles thereto for any angle of deflection. In such an embodiment, the jets into which the plate 22 will subdivide the impinging beam consist of high velocity primary electrons from gun 15 (rather than of low velocity secondary electrons). However, in the operation of this kind of tube 10, these fast jets should preferably be substantially decelerated (down to a potential a few hundred volts above that of the electron-gun cathode) in the space between the plate 22 and the "accelerating electrode" 26. Where, for this purpose, the potential of the "accelerating electrode" 26 is far below that of the plate 22, thousands of very small but very strong electron lenses are established between these electrodes, i. e., one small lens between each pair of aligned apertures of these two electrodes. This results in sharpening the focus of the jets even as they undergo a first deceleration preparatory to being subjected to selective retarding by the control electrodes 24, 27, 29. To this end, and because there is no downward translation of electron velocities by a secondary emitter foil 23 in a thus-modified control assembly, different polarizing potentials must be used for its various electrodes than the "suitable operating potentials" mentioned above. For example, the following potentials may be used: for the plate 22, a potential which is suitably different from that of the coating 20 to establish the required normalizing lens (e. g., about 1.66 as great); one which is a few volts negative for each of the control electrodes 24, 27, 29; and one which is a few hundred volts positive for the "accelerating electrode" 26 and for each of the screen electrodes 25, 28, 30 (each of these potentials being related to the electron gun cathode as a zero-volts reference).

It will be apparent from the foregoing that the coatings R, G, B, for target 17 may be laid down either in dots, as shown in Fig. 7, or in strips as shown in Fig. 6, if the apertures of the control assembly electrodes are round as shown herein and are arranged in a pattern of parallel and perpendicular rows, like that of the dots in Fig. 7, or are elongated, parallel slits. However, the sub-elementary coatings and the apertures may be arranged in any of a great variety of possible patterns as long as they correspond to each other. For example, if desired, the apertures of each electrode may be positioned with their centers located along parallel lines which intersect each other at 60 (and 120) degrees as in the arrangement shown in Fig. 3, and the dot-type coatings R, G and B may be staggered as shown in Fig. 8 so that each picture element is a small triangle having a dot of a different kind of coating material at each of its apexes. Of course, where the coatings R, G, B are positioned in this way, the locations of the small apertures in the various retarding electrodes must be in appropriate correspondence.

When a target 17′ of the type shown in Fig. 9 is used, i. e., a target having a single uniform fluorescent coating 50, this coating is formed of a mixture of materials capable of emitting light components extending well over the visible spectrum. Moreover, the sub-elementary parts R′, B′, G′ of the optical filter which is used with such a single coating are arranged in patterns corresponding in any embodiment to the combination of patterns used for the positions of the small apertures in the several retarding electrodes.

If desired, a tube 10 which utilizes a normalizing electrode 21 may be operated in the manner described above for establishing an electrostatic lens immediately back of the control assembly 16. In such operation, two separate means are acting simultaneously to "normalize" the scanning beam. Therefore, optimum results are obtained in this respect.

Referring again to Fig. 1, one external terminal pin 42 is sealed through the frustum 13 at a point to contact the coating 20. Similarly, a number of other terminal pins 43 are sealed through it in the region where it joins the window 14 to connect respectively to the different elements of the control assembly 16. Thus, means are provided for connecting each of these internal parts of tube 10 to an external circuit element.

In one way of operating tube 10, the electron beam from gun 15 is scanned over the back of the control assembly 16 without being either current-modulated or keyed. The determination of picture element values for the respective interlaced monochromatic images is effected at the control electrodes 24, 27, 29. For example, these electrodes may be respectively connected to individual video signal sources 43, 44, 45 each of which provides a train of positive-going impulses which are amplitude-modulated to represent the picture-element values of a different monochromatic image. If each of these electrodes 24, 27 or 29 is biased a little below cut-off, these impulses effect both sequential color switching and selective video modulation.

The color switching may be at either an element, a line, or a field recurrence rate. Moreover, simultaneous operation is also possible because of the sub-division of the beam into several jets, each of which can cause light emissions of a different color. For such operation, the separate video signals are not pulsed and the control electrodes are statically biased for class A density-modulation.

In another way of operating tube 10, appropriately-phased color-switching signals, such as three-phase sine waves, are respectively applied to the control electrodes 24, 27 and 29 while a multiplex color video signal is applied to gun 15 while it is biased for class A operation.

Figure 5:
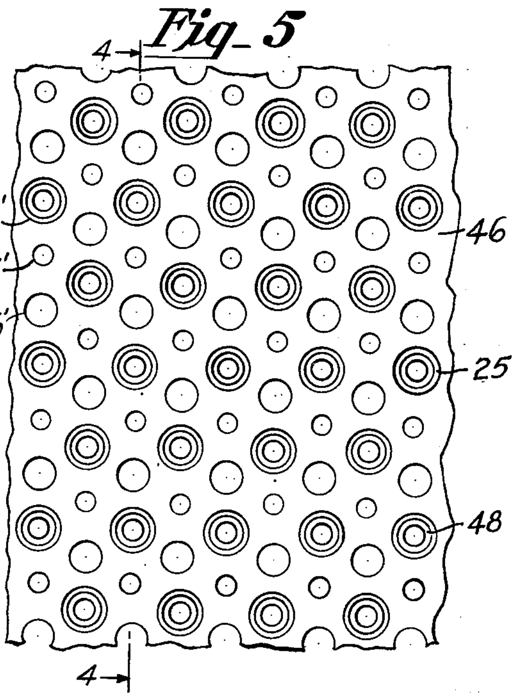
Fig. 5 represents a similarly magnified view of a small portion of a section of the assembly shown in Fig. 4, the section being taken along line 5—5 of Fig. 4.

Fig. 4 is a sectional view of a portion of a control assembly which is operable in a three-color system though it has only two control electrodes, 46, 48, and two screen electrodes, 25, 30. As best understood with reference to Fig. 5, each of the control electrodes 46, 48 has apertures of three different sizes (small, 35'; intermediate, 36'; and large, 34'). The sizes of the apertures are such that: (1) when a control electrode is polarized at the most positive (or least negative) of three predetermined control potentials, this electrode will not cut off the current of jets directed at any of its apertures; (2) when it is polarized at the intermediate potential of the three, it will cut off the current of jets directed at its small apertures but not that of those directed at its intermediate and large apertures; (3) and when it is polarized at the most negative (or least positive) of the three potentials, it will not cut off the current of jets directed at its large apertures but will cut off that of jets directed at its intermediate and small apertures. The most positive potential may be chosen so that when it is applied to a control electrode 46 or 48 jets which are directed at the smallest apertures thereof, though they are not cut off thereby, are decelerated to such an extent that they can readily be current-modulated by fluctuations in the potential of the electrode, i. e., so that the electrode can modulate these jets with reasonably high mu control. Likewise, the intermediate potential can be chosen so that the electrode to which it is applied will similarly decelerate jets which are directed at its intermediate apertures; and the most negative potential may be chosen so that the electrode to which it is applied will do the same to jets which are directed at its large apertures.

The geometric arrangement of the apertures on each control electrode and the orientation of the two control electrodes with respect to each other is such that each of the intermediate-size apertures of one electrode is in alignment with a corresponding one of those of the other, while each small aperture of each of these electrodes is in alignment with a corresponding large aperture of the other. As a result of this, it is possible to apply a different appropriate combination of two of the three control potentials to the control electrodes 46 and 48 to cut off any two sets of jets at a given time and selectively pass the third on to the target 17. In one way of accomplishing this, a three-step voltage wave may be generated with each of the steps providing one of said three control potentials and having a duration corresponding to one period of the color switching frequency and these may be applied in push-pull to the two control electrodes. Where this is done, the following three conditions may be made to exist during three successive switching periods: (1) The polarization of both control electrodes at the intermediate potential. Under this condition, jets directed at the small apertures of each control electrode will be cut off. Since the small apertures of one are in alignment with the large apertures of the other, the only jets which will pass through both electrodes to the target 17 will be those which are directed at their mutually-aligned intermediate-sized apertures. If the value of the intermediate voltage is chosen so that these jets are properly decelerated, in the manner indicated above, a video voltage may be applied to either or both of these electrodes by superimposing it onto the control voltage(s), to modulate the jets in accordance with sub-elementary monochromatic picture-intensities. (2) Polarization of the back control electrode 46 at the most positive (or least negative) potential and of the front control electrode 48 at the most negative (or least positive) potential. As a result, none of the jets will be stopped at the back control electrode 46 whereas all of them except those directed at the large apertures of the front control electrode 48 will be stopped by it. If the amplitude of the potentials is chosen to accomplish the deceleration described above, jets directed at the small apertures of the back control electrode will be controllable by fluctuations thereof and those directed at the large apertures of the front control electrode 48 will be controllable by its fluctuations. Since these are the same jets, it follows that a video signal applied to either of these electrodes or to both of them simultaneously will control this set of jets and no other. (3) Polarization of the back control electrode at the most negative (or least positive) control potential and of the front control electrode at the most positive (or least negative) potential. In this case, jets directed at the small and intermediate apertures of the back control electrode will be cut off by it, while jets directed at its large size apertures will pass through them and will continue on through the small apertures of the front control electrode since it will not be capable of cutting off any jets during this period. From the foregoing it is apparent that under these conditions the amplitudes of the voltages may be chosen so that a video voltage may be applied to either or both of these electrodes to modulate selectively this one set of jets.

If desired, the push-pull step voltages in question may be utilized merely for selectively switching the sets of jets on and off. In such a case, the multiplex color video signal is applied between the cathode and control grid of the electron gun. In either manner of operation, i. e., whether the multiplex video signal is applied to the gun or to the control electrodes, the switching signals must be appropriately phased with the sequentially occurring single color impulses of the full-color video signal.

The video modulation may be accomplished at the electron gun 15 whether a normalizing electrode 21 is used or not inasmuch as the secondary emission from a normalizing electrode will be proportional to the current of the bombarding primary beam.

Where the sub-elementary coatings for the target 17 are of the strip rather than the dot type, the apertures may be elongated slits rather than round holes. While this has the disadvantage of being less suitable for color interlacing in two dimensions (horizontal as well as vertical) it has the advantage that a brighter picture can be obtained due to reduced masking of the electron beam current from the target 17 by the electrodes of the assembly 16.

While the principle of the present invention has been illustrated by an embodiment in which it is utilized particularly for color control and in a tube in which electrons are concentrated into a thin beam and scanned over a polychromatic target, it need not be restricted to such utilizations. For example on the one hand, it is within the scope of the invention to embody it in any of a variety of circuit switching arrangements not necessarily related to color control; and on the other, it may be embodied in a color image tube in which groups of the jets which control light emissions of different colors are all respectively switched on and off simultaneously.

What we claim is:

1. An electron discharge device comprising: an electron-excitable surface for producing a polychromatic image, said surface including a plurality of sub-elementary areas for producing monochromatic components of said image; a source of electrons directed toward said surface; a group of electrodes mounted between said surface and said source of electrons for controlling excitation of said sub-elementary areas selectively in accordance with respective monochromatic video voltages, said group of electrodes including an apertured plate for effectively subdividing a flow of electrons from said source into a plurality of electron jets; means for directing said jets along individual axes each of which terminates at a predetermined one of said sub-elementary areas; and said group of electrodes including an electrode having apertures which are aligned respectively with said axes and are of at least two different predetermined sizes for differently controlling jets which are directed at apertures of different sizes.

2. An electron discharge device as in claim 1 which further comprises terminals over which color switching signals may be applied to said group of electrodes and a multiplex color video signal may be applied to said source of electrons.

3. An electron discharge device comprising: an electron-excitable surface for producing a polychromatic image and having a plurality of sub-elementary areas including discrete sets thereof for producing different monochromatic components of said image; a source of electrons directed toward said surface; a group of electrodes mounted between said surface and said source of electrons for controlling excitation of said sets of sub-elementary areas selectively in accordance with respective monochromatic video voltages, said group of electrodes including an apertured plate for effectively subdividing a flow of electrons from said source into a plurality of electron jets; means for directing said jets along individual axes each of which terminates at a predetermined one of said sub-elementary areas; said group of electrodes including a different control electrode for controlling the excitation of sub-elementary coatings of each different set thereof; each control electrode having apertures which are aligned respectively with said axes and are of at least two different predetermined sizes, the small apertures of each control electrode being aligned with the axes of a different set of jets.

4. An electron discharge device as in claim 3 in which said group of electrodes includes a screen electrode adjacent to each control electrode on its side towards said electron-excitable surface.

5. An electron discharge device comprising: an electron-excitable surface for producing a polychromatic image and having a plurality of sub-elementary areas including discrete sets thereof for producing different monochromatic components of said image; a source of electrons directed toward said surface; a group of electrodes mounted between said surface and said source of electrons for controlling excitation of said sets of sub-elementary areas selectively in accordance with respective monochromatic video voltages, said group of electrodes including an apertured plate for effectively subdividing a flow of electrons from said source into a plurality of electron jets; means for directing said jets along individual axes each of which terminates at a predetermined one of said sub-elementary areas; said group of electrodes including a different control electrode for controlling the excitation of sub-elementary coatings of each different set thereof; each control electrode having apertures which are aligned respectively with said axes and are of at least two different predetermined sizes, the small apertures of each control electrode being aligned with the axes of a different set of jets; and terminals over which color-switching signals may be individually applied to said control electrodes.

6. An electron discharge device comprising: an electron-excitable surface for producing a polychromatic image and having a plurality of sub-elementary areas including three discrete sets thereof for producing three different monochromatic components of said image; a source of electrons directed toward said surface; a group of electrodes mounted between said surface and said source of electrons fc controlling excitation of said sets of sub-elementary areas selectively in accordance with three respective monochromatic video voltages, said group of electrodes including an apertured plate for effectively subdividing a flow of electrons from said source into a plurality of electron jets; means for directing said jets along individual axes, each of which terminates at a predetermined one of said sub-elementary areas; said group of electrodes including two control electrodes in co-operative relationship for controlling selectively the excitation of sub-elementary areas of any of said three different sets thereof; each control electrode having apertures which are aligned respectively with said axes, one set of its apertures being of an intermediate size, another set of a relatively small size and a third set of a relatively large size; the intermediate size apertures of each control electrode being in alignment with those of the other control electrode; the relatively small apertures of each control electrode being aligned with the relatively large apertures of the other; and each set of apertures of either control electrode being in alignment with the axes of jets which are directed at a different set of said sub-elementary areas.

7. An electron discharge device as in claim 6 in which said group of electrodes includes a screen electrode adjacent to each control electrode on its side toward said electron-excitable surface.

8. An electron discharge device comprising an electron-excitable surface for producing a polychromatic image, said surface including a plurality of sub-elementary areas for producing monochromatic components of said image; a source of electrons directed toward said surface; a group of electrodes mounted between said surface and said source of electrons for controlling excitation of said sub-elementary areas selectively in accordance with respective monochromatic video voltages, said group of electrodes including an apertured plate for effectively subdividing a flow of electrons from said source into a plurality of electron jets; means including secondary-emitter metal foils covering the apertures of said plate for directing said jets along individual axes each of which terminates at a predetermined one of said sub-elementary areas; and said group of electrodes including an electrode having apertures which are aligned respectively with said axes and are of at least two different predetermined sizes for differently controlling jets which are directed at apertures of different sizes.

9. An electron discharge device comprising an electron-excitable surface for producing a polychromatic image, said surface including a plurality of sub-elementary areas for producing monochromatic components of said image; a source of electrons directed toward said surface; a group of electrodes mounted between said surface and said source of electrons for controlling excitation of said sub-elementary areas selectively in accordance with respective monochromatic video voltages, said group of electrodes including an apertured plate for effectively subdividing a flow of electrons from said source into a plurality of electron jets; means for directing said jets along individual axes each of which terminates at a predetermined one of said sub-elementary areas; said last-mentioned means including an electrode surrounding an intermediate portion of the paths of electrons from said source to said apertured plate and in suitable spaced relationship with the plate for producing an electrostatic lens for normalizing said paths with respect thereto; and said group of electrodes including an electrode having apertures which are aligned respectively with said axes and are of at least two different predetermined sizes for differently controlling jets which are directed at apertures of different sizes.

10. A color television picture tube comprising an evacuated envelope containing: a fluorescent screen for producing a polychromatic image, said screen including a plurality of sub-elementary fluorescent coatings for producing monochromatic components of said image; an electron gun for projecting a beam of electrons toward said screen; a group of electrodes mounted between said gun and said screen for controlling electron excitation of said sub-elementary coatings selectively in accordance with respective monochromatic video voltages; said group of electrodes including an apertured plate for effectively subdividing a beam of electrons from said gun into a plurality of electron jets at a plurality of different possible points of impingement; means for directing different jets along substantially parallel individual axes each of which terminates at a predetermined one of said coatings; and a control electrode having apertures which are aligned respectively with said axes and are of at least two different predetermined sizes for differently controlling jets which are directed at apertures of different sizes.

11. In an electron discharge device, a control assembly comprising means including an apertured plate for effectively subdividing a stream of electrons into a plurality of electron jets having substantially parallel axes, at least one control electrode positioned on the side of said plate from which said jets emerge and having apertures which are aligned respectively with said axes and are of at least two different predetermined sizes for differently controlling jets which are directed at apertures of different sizes, and a screen electrode adjacent each control electrode on its side farthest from said plate.

MILTON ROSENBERG.
JAN A. RAJCHMAN.

REFERENCES CITED

The following references are of record in the file of this patent:

UNITED STATES PATENTS

| Number | Name | Date |
|---|---|---|
| 2,213,070 | Farnsworth | Aug. 27, 1940 |
| 2,307,188 | Bedford | Jan. 5, 1943 |
| 2,431,113 | Glyptis et al. | Nov. 18, 1947 |
| 2,446,249 | Schroeder | Aug. 3, 1948 |
| 2,446,440 | Swedlund | Aug. 3, 1948 |
| 2,446,791 | Schroeder | Aug. 10, 1948 |
| 2,461,515 | Bronwell | Feb. 15, 1949 |
| 2,498,705 | Parker | Feb. 28, 1950 |
| 2,518,200 | Sziklai et al. | Aug. 8, 1950 |
| 2,543,477 | Sziklai et al. | Feb. 27, 1951 |